US007590824B2

(12) United States Patent
Ahmed et al.

(10) Patent No.: US 7,590,824 B2
(45) Date of Patent: Sep. 15, 2009

(54) MIXED SUPERSCALAR AND VLIW INSTRUCTION ISSUING AND PROCESSING METHOD AND SYSTEM

(75) Inventors: Muhammad Ahmed, Austin, TX (US);
Erich Plondke, Austin, TX (US);
Lucian Codrescu, Austin, TX (US);
William C. Anderson, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 281 days.

(21) Appl. No.: 11/093,375

(22) Filed: Mar. 29, 2005

(65) Prior Publication Data
US 2006/0224862 A1    Oct. 5, 2006

(51) Int. Cl.
*G06F 9/30*    (2006.01)
(52) U.S. Cl. .......................... 712/214; 712/23; 712/24
(58) Field of Classification Search .................. 712/23, 712/24, 214
See application file for complete search history.

(56) References Cited

U.S. PATENT DOCUMENTS

| | | | |
|---|---|---|---|
| 4,901,307 A | 2/1990 | Gilhousen et al. | |
| 5,103,459 A | 4/1992 | Gilhousen et al. | |
| 5,295,249 A * | 3/1994 | Blaner et al. ................ | 712/213 |
| 5,502,826 A | 3/1996 | Vassiliadis et al. | |
| 6,453,407 B1 * | 9/2002 | Lavi et al. ..................... | 712/24 |
| 2006/0206902 A1 | 9/2006 | Jamil et al. | |
| 2006/0218379 A1 | 9/2006 | Codrescu et al. | |
| 2006/0218559 A1 | 9/2006 | Ahmed et al. | |

FOREIGN PATENT DOCUMENTS

EP    0855648    7/1998

OTHER PUBLICATIONS

"The Approach to Multiple Instruction Execution in the GMICRO/400 Processor"; Yoshida et al.;1991; IEEE.*
"Long Words and Wide Ports: Reinventing the Configurable Processor"; Jani et al.; Aug. 2004.*
"Computer Architecture: A Quantitative Approach"; Hennessy et al.; 2nd Ed.; 1996; Morgan Kaufmann.*
International Search Report PCT/US2006/011646, International Search Authority European Patent Office, Dec. 1, 2006.

(Continued)

*Primary Examiner*—Niketa I Patel
*Assistant Examiner*—Benjamin P Geib
(74) *Attorney, Agent, or Firm*—Peter M. Kamarchik; Nicholas J. Pauley

(57) ABSTRACT

Techniques for processing transmissions in a communications (e.g., CDMA) system. A method and system for issuing and executing mixed architecture instructions in a multiple-issue digital signal processor receives in a mixed instruction listing a plurality of digital signal processor instructions. The plurality of digital signal processor instructions includes a plurality of parallel executable instructions (e.g., VLIW instructions or instruction packets) mixed among a plurality of series executable instructions (e.g., superscalar instructions). The series executable instructions are associated by various instruction dependencies. The method and system further identify in the mixed instruction listing the plurality of parallel executable instructions. Once identified, the parallel executable instructions are first executed in parallel irrespective of any such instruction's relative order in the mixed instruction listing. Then, the series executable instructions are executed serially according to said various instruction dependencies.

25 Claims, 5 Drawing Sheets

OTHER PUBLICATIONS

International Preliminary Report on Patentability PCT/US2006/011646 International Bureau of WIPO Oct. 3, 2007.

Written Opinion PCT/US2006/011646 International Search Authority European Patent Office Sep. 9, 2007.

* cited by examiner

| I0 | I1 | Younger Load | Younger Store | Younger A32 | Younger A64 | Younger Jump | Younger CR | Younger M | Younger S |
|---|---|---|---|---|---|---|---|---|---|
| Older | Load | 1/0 | 1/0 | 1/0 | 1/3 | 1/3 | 1/NG | 1/2 | 1/3 |
| Older | Store | 0/1 | 0/NG | 0/1 | 0/3 | 0/3 | 0/NG | 0/2 | 0/3 |
| Older | A32 | 1/0 | 1/0 | 1/0 | 1/3 | 1/3 | 1/NG | 1/2 | 1/3 |
| Older | A64 | 2/0 | 2/0 | 2/0 | 2/3 | 2/3 | 2/NG | 0/1 | 2/3 |
| Older | Jump | 3/X | 3/X | 3/X | 3/X | 3/X | 3/NG | 3/X | 3/X |
| Older | CR | 3/NG | 3/NG | 3/NG | 3/NG | 3/NG | 3/NG | 3/NG | 3/NG |
| Older | M | 2/0 | 2/0 | 2/0 | 2/3 | 2/3 | 2/NG | 2/NG | 2/3 |
| Older | S | 3/0 | 3/0 | 3/0 | 3/2 | 3/NG | 3/NG | 3/2 | 3/NG |

MIXED SUPERSCALAR AND VLIW INSTRUCTION ISSUING AND PROCESSING METHOD AND SYSTEM

FIELD

The disclosed subject matter relates to data communications. More particularly, this disclosure relates to a novel and improved method and system for mixed superscalar and VLIW instruction issuing and processing in a digital signal processor.

DESCRIPTION OF THE RELATED ART

A modern day communications system must support a variety of applications. One such communications system is a code division multiple access (CDMA) system that supports voice and data communication between users over a satellite or terrestrial link. The use of CDMA techniques in a multiple access communication system is disclosed in U.S. Pat. Nos. 4,901,307, entitled "SPREAD SPECTRUM MULTIPLE ACCESS COMMUNICATION SYSTEM USING SATELLITE OR TERRESTRIAL REPEATERS," and 5,103,459, entitled "SYSTEM AND METHOD FOR GENERATING WAVEFORMS IN A CDMA CELLULAR TELEHANDSET SYSTEM," both assigned to the assignee of the claimed subject matter.

A CDMA system is typically designed to conform to one or more standards. One such first generation standard is the "TIA/EIA/IS-95 Terminal-Base Station Compatibility Standard for Dual-Mode Wideband Spread Spectrum Cellular System," hereinafter referred to as the IS-95 standard. The IS-95 CDMA systems are able to transmit voice data and packet data. A newer generation standard that can more efficiently transmit packet data is offered by a consortium named "$3^{rd}$ Generation Partnership Project" (3GPP) and embodied in a set of documents including Document Nos. 3G TS 25.211, 3G TS 25.162, 3G TS 25.213, and 3G TS 25.114, which are readily available to the public. The 3GPP standard is hereinafter referred to as the W-CDMA standard.

Digital signal processors (DSPs) may find valuable use in wireless handsets complying with the above standards. In particular, wireless handsets are requiring and increasingly will require that the DSP execute instructions from user-orientation, scientific, and multimedia applications, as well as many other types of applications. The processor resource requirements may vary widely and dynamically for applications such as television broadcasts, streaming message tickers, electronic mail (including messages with attached documents), as well as resident applications, such as photography and PDA applications, all from the same DSP.

In such DSPs, different applications may require the use of instructions that are best formed and operable in different processor architectures. For example, some instructions may be best formed and operable in an architecture known as a superscalar architecture. On the other hand, other instructions may be best formed and operable in an architecture known as the VLIW (Very Long Instruction Word) architecture. A superscalar architecture uses dynamic scheduling, e.g., the hardware controls the issue of instruction dynamically. For static scheduling, the VLIW architecture depends on a compiler to schedule concurrent instructions and rearranges them into a long instruction word. Such a compiler performs issue scheduling for parallel execution of the VLIW instructions.

The superscalar architecture improves performance by concurrent execution of scalar instructions in more than one instruction per cycle. That is, a scalar processor executes one instruction at a time. In contrast, the superscalar architecture allows concurrent execution of instructions in the same pipeline stage. The superscalar architecture improves the performance of the execution of scalar instructions, but not without certain limitations. For example, the performance limitations of the superscalar architecture include dealing with data dependencies, procedural dependencies, and resource conflicts.

As the superscalar architecture of a processor becomes more complex, the difficulties of scheduling instruction issue become more complex. As such, hardware devoted to resolving dependencies and deciding on instruction issue must grow as a proportion of the total processor hardware. Another way of understanding the superscalar architecture is as a dynamic instruction scheduler. As such, the processor hardware decides dynamically which instructions to execute in parallel.

An alternative approach causes the compiler to statically schedule execution. This is the basic concept behind the VLIW architecture. The VLIW architecture demonstrates both advantages and disadvantages. The main advantage is the saving in processor hardware. In the VLIW architecture, the compiler decides what can be executed in parallel, and the hardware simply executes the instructions. There is no need to check for dependencies or decide on scheduling. The compiler has already resolved these issues. This means that much more processor hardware may be devoted to useful computation, larger caches, and other resources. As a result, higher processor performance becomes possible.

There are, however, disadvantages associated with the VLIW architecture. First, compilers may be harder to build. Secondly, as application programs increase in size, it may not always be practical to find enough instructions that can be done in parallel to fill all the available slots in an instruction queue. It is likely, therefore, that the majority of instructions, in typical applications, will have empty instruction or issue slots. This results in wasted space and larger code.

For a wireless handset DSP, therefore, there are advantages and disadvantages associated with both superscalar and VLIW architectures. A DSP capable of demonstrating the beneficial aspects of both superscalar and VLIW architectures, while avoiding the detrimental or disadvantageous aspects of these architectures could result in significant processing and operational improvements. Accordingly, there is a need for a wireless handset DSP capable of beneficially and synergistically integrating a superscalar architecture with a VLIW architecture for operating a wide variety of applications.

SUMMARY

Techniques for mixed superscalar and VLIW instruction issuing and processing are disclosed, which techniques improve both the operation of the processor and the efficient and more rapid processing of digital signal processor instructions for increasingly robust software applications for personal computers, personal digital assistants, wireless handsets, and similar electronic devices, as well as increasing the processor speed and service quality.

According to one aspect of the disclosed subject matter, there is provided a method and a system for issuing and executing mixed architecture instructions in a multiple-issue digital signal processor. The digital signal processor receives, in a mixed instruction listing, a plurality of digital signal processor instructions. The plurality of digital signal processor instructions includes a plurality of parallel executable instructions (e.g., VLIW instructions or instruction packets) mixed among a plurality of series executable instructions (e.g., superscalar instructions). The series executable instructions are associated by various instruction dependencies. The method and system further identify in the mixed instruction listing the plurality of parallel executable instructions. Once identified, the parallel executable instructions are first executed in parallel irrespective of any such instruction's relative order in the mixed instruction listing. Then, the series executable instructions are executed serially according to said various instruction dependencies.

These and other aspects of the disclosed subject matter, as well as additional novel features, will be apparent from the description provided herein. The intent of this summary is not to be a comprehensive description of the claimed subject matter, but rather to provide a short overview of some of the subject matter's functionality. Other systems, methods, features and advantages here provided will become apparent to one with skill in the art upon examination of the following FIGUREs and detailed description. It is intended that all such additional systems, methods, features and advantages that are included within this description, be within the scope of the accompanying claims.

BRIEF DESCRIPTIONS OF THE DRAWINGS

The features, nature, and advantages of the disclosed subject matter will become more apparent from the detailed description set forth below when taken in conjunction with the drawings in which like reference characters identify correspondingly throughout and wherein.

Figure 3:
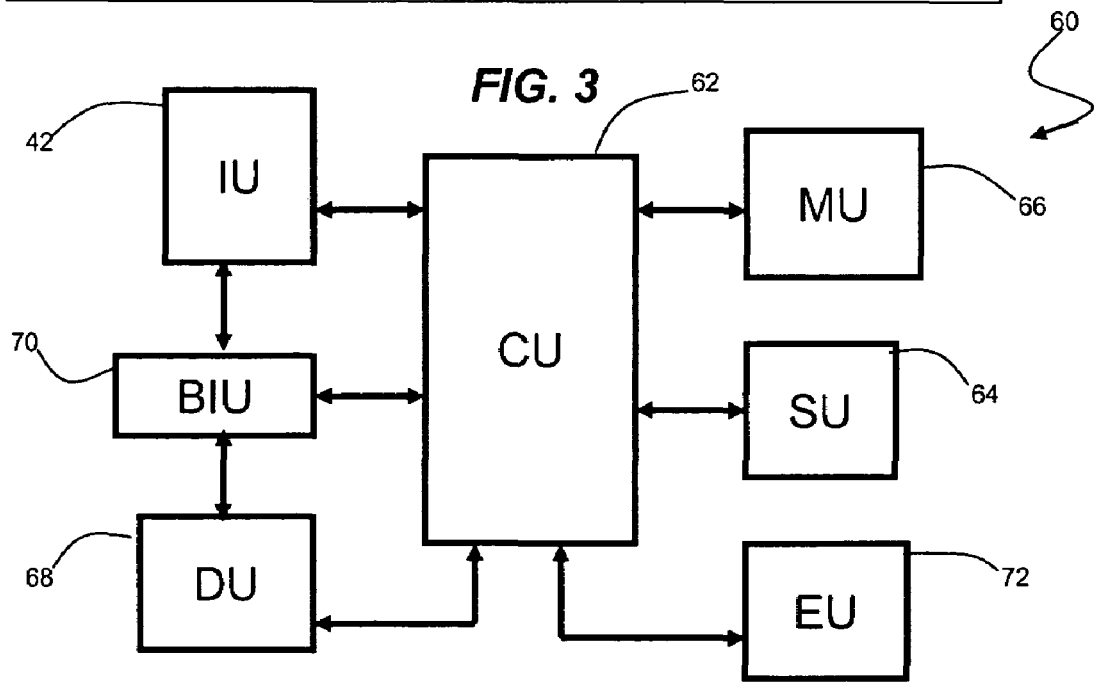
Figures 4, 5:
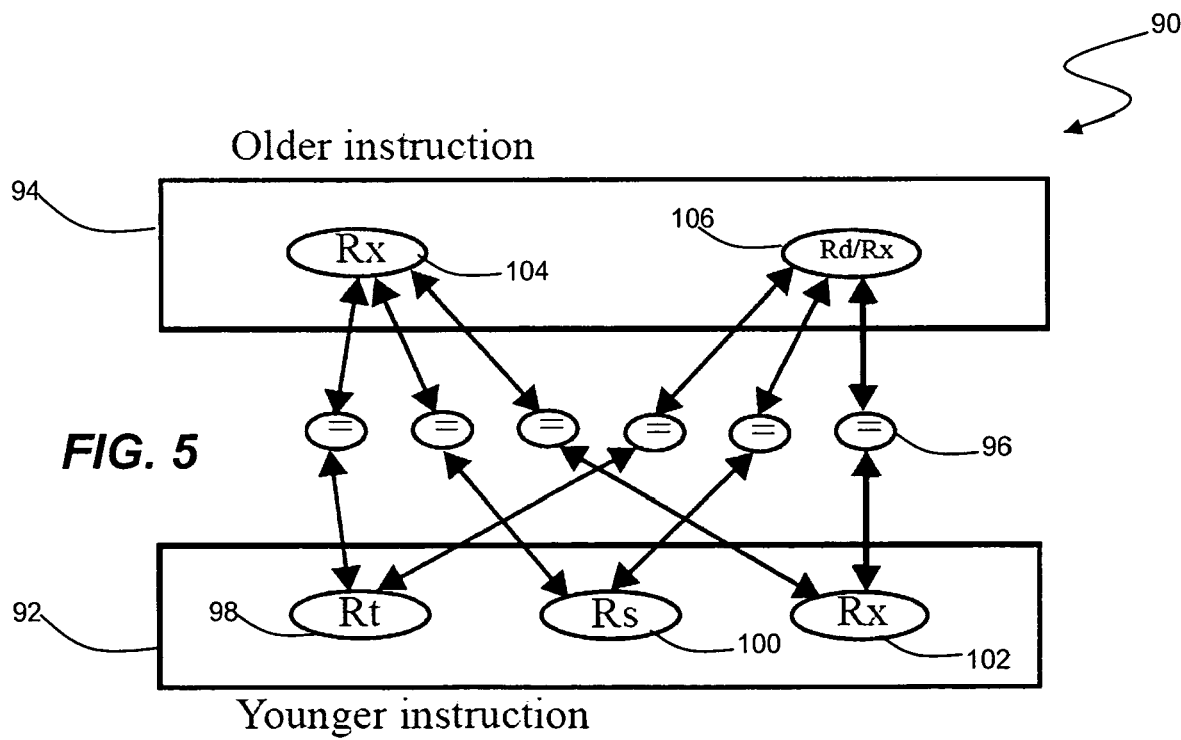
Figure 6:
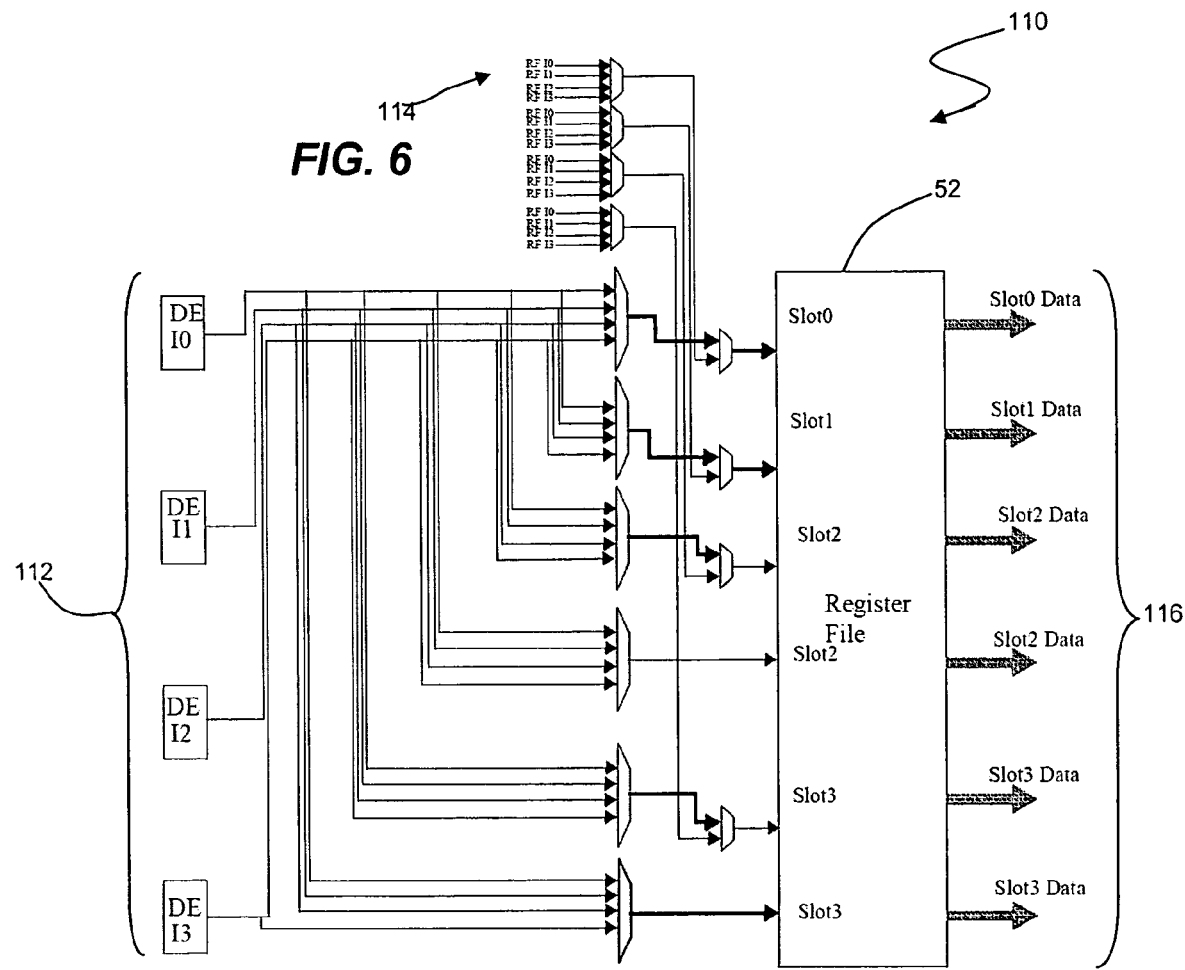
Figure 8:
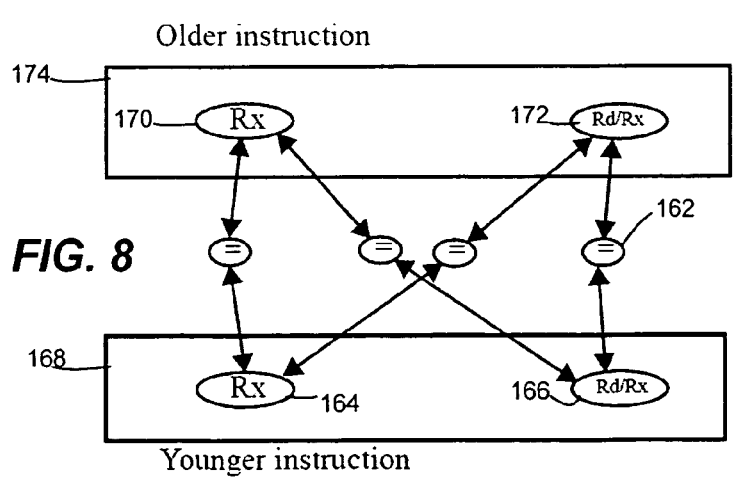
Figure 7:
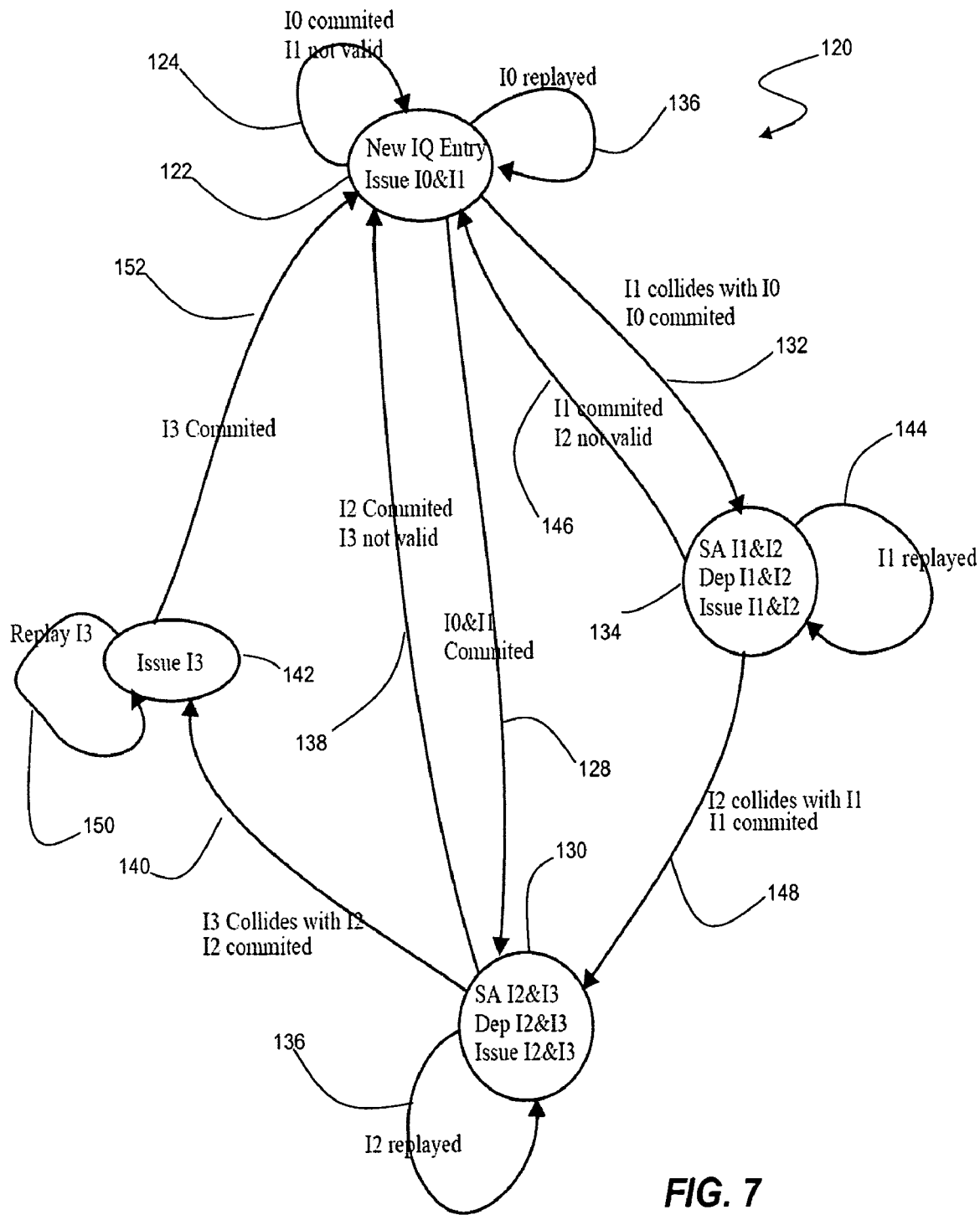

FIG. 3 presents a top level diagram of a control unit for disclosed embodiment;

FIG. 4 presents certain aspects of the slot allocation process for slot collision avoidance in an illustrative embodiment;

FIG. 5 conceptually relates certain aspects of read after write hazard processing for one embodiment of the disclosed subject matter;

FIG. 6 provides a steering logic diagram for an illustration of the disclosed subject matter;

FIG. 7 is a data flow diagram for the superscalar issue process of the present disclosure; and FIG. 8 portrays write after write hazard processing for the general purpose register of the illustrated embodiment.

DETAILED DESCRIPTION OF THE SPECIFIC EMBODIMENTS

Figure 1:
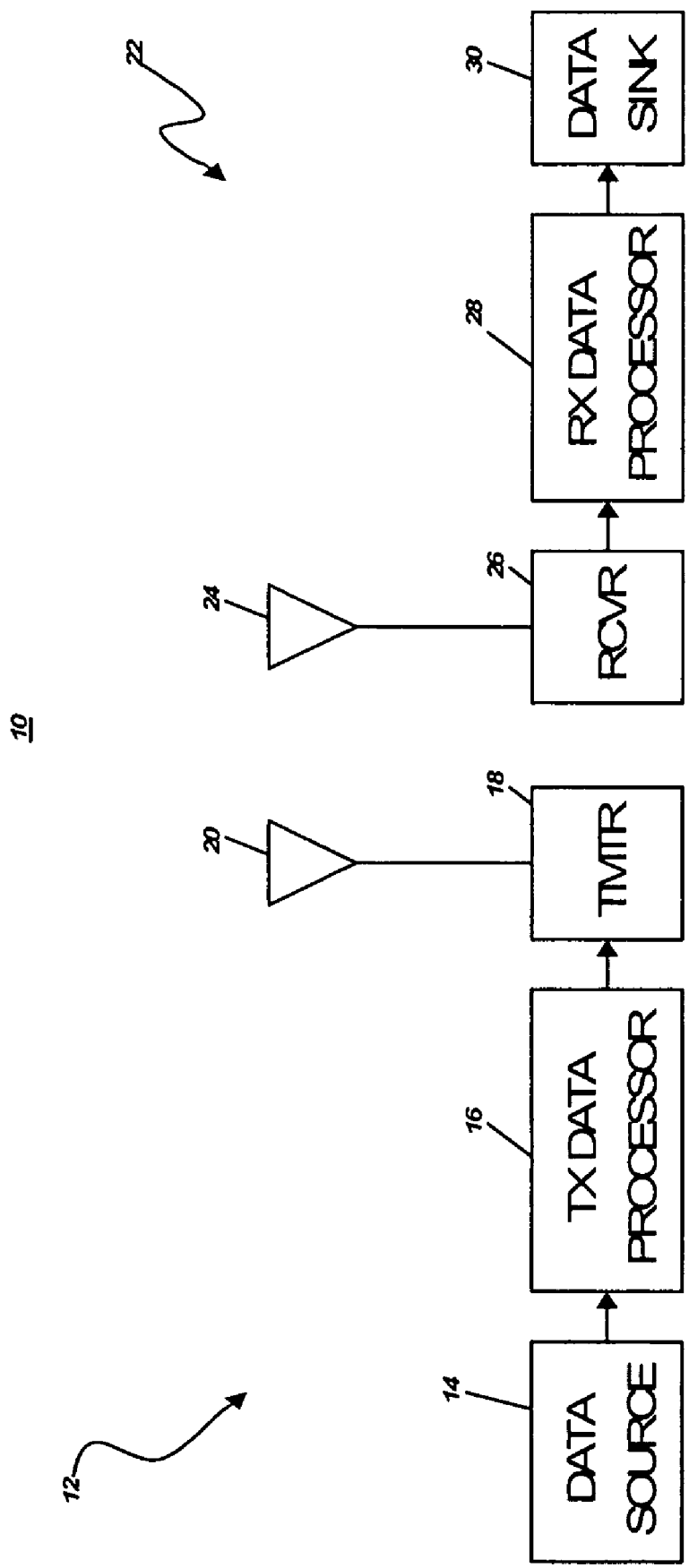
FIG. 1 is a simplified block diagram of a communications system that can implement the present embodiment.

FIG. 1 is a simplified block diagram of a communications system 10 that can implement the presented embodiments. At a transmitter unit 12, data is sent, typically in blocks, from a data source 14 to a transmit (TX) data processor 16 that formats, codes, and processes the data to generate one or more analog signals. The analog signals are then provided to a transmitter (TMTR) 18 that modulates, filters, amplifies, and up converts the baseband signals to generate a modulated signal. The modulated signal is then transmitted via an antenna 20 to one or more receiver units.

At a receiver unit 22, the transmitted signal is received by an antenna 24 and provided to a receiver (RCVR) 26. Within receiver 26, the received signal is amplified, filtered, down converted, demodulated, and digitized to generate in phase (I) and (Q) samples. The samples are then decoded and processed by a receive (RX) data processor 28 to recover the transmitted data. The decoding and processing at receiver unit 22 are performed in a manner complementary to the coding and processing performed at transmitter unit 12. The recovered data is then provided to a data sink 30.

The signal processing described above supports transmissions of voice, video, packet data, messaging, and other types of communication in one direction. A bi-directional communications system supports two-way data transmission. However, the signal processing for the other direction is not shown in FIG. 1 for simplicity.

Communications system 10 can be a code division multiple access (CDMA) system, a time division multiple access (TDMA) communications system (e.g., a GSM system), a frequency division multiple access (FDMA) communications system, or other multiple access communications system that supports voice and data communication between users over a terrestrial link. In a specific embodiment, communications system 10 is a CDMA system that conforms to the W-CDMA standard.

Figure 2:
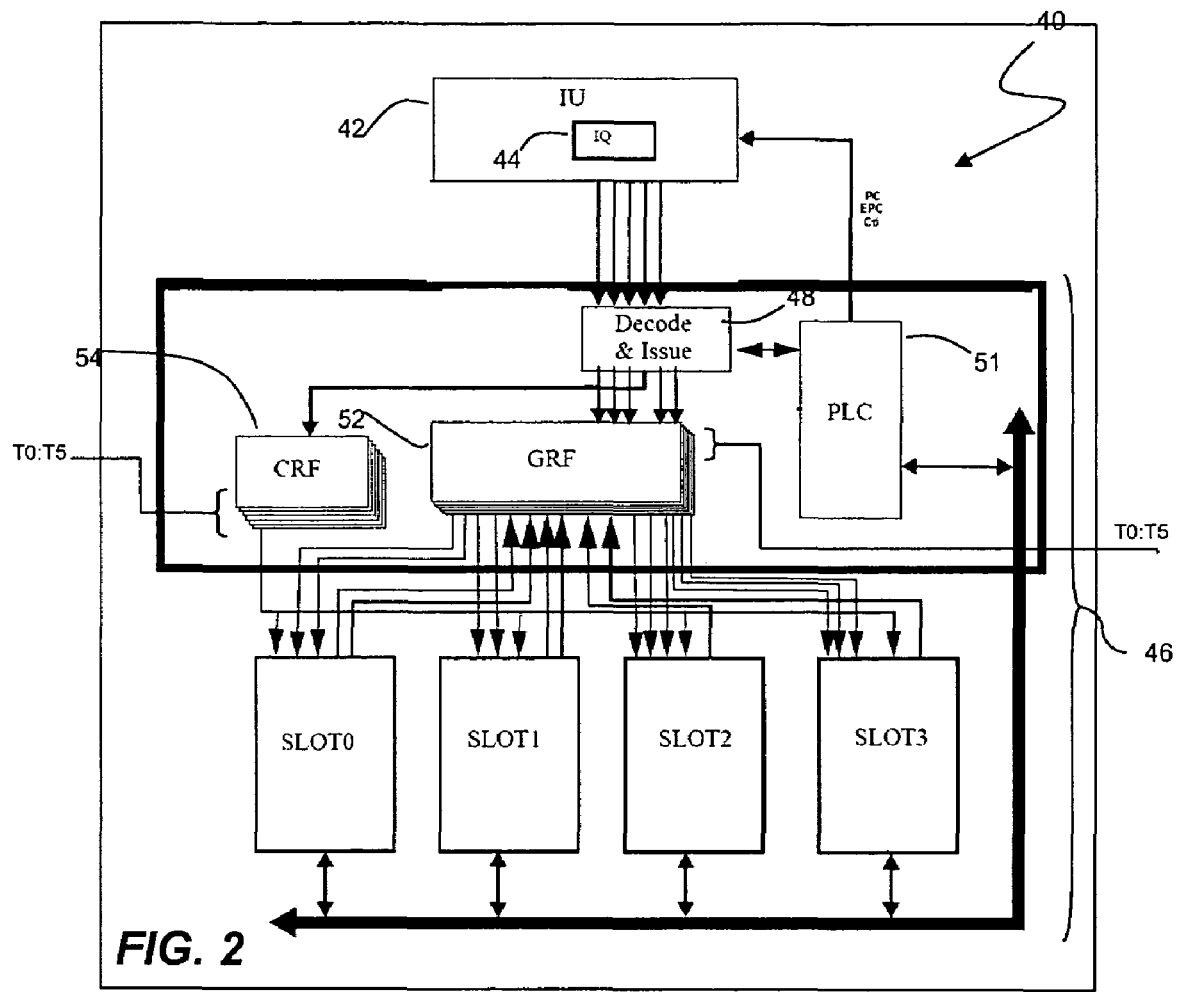
FIG. 2 illustrates a DSP architecture for carrying forth the teachings of the present embodiment.

FIG. 2 illustrates DSP 40 architecture that may serve as the transmit data processor 16 and receive data processor 28 of FIG. 1. Recognize that DSP 40 only represents one embodiment among a great many of possible digital signal processor embodiments that may effectively use the teachings and concepts here presented. In DSP 40, therefore, threads T0 through T5 ("T0:T5"), contain sets of instructions from different threads. Instruction unit (IU) 42 fetches instructions for threads T0:T5. IU 42 queues instructions I0 through I3 ("I0:I3") into instruction queue (IQ) 44. IQ 44 issues instructions I0:I3 into processor pipeline 46. Processor pipeline 46 includes control circuitry as well as a data path. From IQ 44, a single thread, e.g., thread T0, may be selected by decode and issue circuit 48. Pipeline logic control unit (PLC) 51 provides logic control to decode and issue circuitry 48 and IU 42.

IQ 44 in IU 42 keeps a sliding buffer of the instruction stream. Each of the six threads T0:T5 that DSP 40 supports has a separate eight-entry IQ 44, where each entry may store one VLIW packet or up to four individual instructions. Decode and issue circuitry 48 logic is shared by all threads for decoding and issuing a VLIW packet or up to two superscalar instructions at a time, as well as for generating control buses and operands for each pipeline SLOT0:SLOT3. In addition, decode and issue circuitry 48 does slot assignment and dependency check between the two oldest valid instructions in IQ 44 entry for instruction issue using, for example, using superscalar issuing techniques. PLC 51 logic is shared by all threads for resolving exceptions and detecting pipeline stall conditions such as thread enable/disable, replay conditions, maintains program flow etc.

In operation, general register file (GRF) 52 and control register file (CRF) 54 of selected thread is read, and read data is sent to execution data paths for SLOT0:SLOT3. SLOT0: SLOT3, in this example, provide for the packet grouping combination employed in the present embodiment. Output from SLOT0:SLOT3 returns the results from the operations of DSP 40.

The present embodiment may employ a hybrid of a heterogeneous element processor (HEP) system using a single microprocessor with up to six threads, T0:T5. Processor pipeline 46 has six stages, matching the minimum number of processor cycles necessary to fetch a data item from IU 42. DSP 40 concurrently executes instructions of different threads T0:T5 within a processor pipeline 46. That is, DSP 40 provides six independent program counters, an internal tagging mechanism to distinguish instructions of threads T0:T5 within processor pipeline 46, and a mechanism that triggers a thread switch. Thread-switch overhead varies from zero to only a few cycles.

DSP 40, therefore, provides a general-purpose digital signal processor with high-performance and low-power across a wide variety of signal, image, and video processing applications. FIG. 3 provides a brief overview of the DSP 40 micro-architecture for one manifestation of the disclosed subject matter. Implementations of the DSP 40 micro-architecture support interleaved multithreading (IMT). In this execution model, the hardware supports concurrent execution of multiple hardware threads T0:T5 by interleaving instructions from different threads in the pipeline. This feature allows DSP 40 to include an aggressive clock frequency while still maintaining high core and memory utilization. IMT provides high throughput without the need for expensive compensation mechanisms such as out-of-order execution, extensive forwarding networks, and so on. Moreover, the DSP 40 may include variations of IMT, such as those variations and novel approaches disclosed in the commonly-assigned U.S. patent Publication Nos. 20060206902 and 20060218559 which are entitled "Variable Interleaved Multithreaded Processor Method and System" and "Method and System for Variable Thread Allocation and Switching in a Multithreaded Processor," such disclosures are here referred to as the "IMT Variations."

The subject matter here disclosed deals with the execution model of a single thread. The software model of IMT can be thought of as a shared memory multiprocessor. A single thread sees a complete uni-processor DSP 40 with all registers and instructions available. Through coherent shared memory facilities, this thread is able to communicate and synchronize with other threads. Whether these other threads are running on the same processor or another processor is largely transparent to user-level software.

Turning to FIG. 3, the present micro-architecture 60 for DSP 40 includes control unit (CU) 62, which performs many of the control functions for processor pipeline 46. CU 62 schedules threads and requests mixed 16-bit and 32-bit instructions from IU 42. CU 62, furthermore, schedules and issues instructions to three execution units, shift-type unit (SU) 64, multiply-type unit (MU) 66, and load/store unit (DU) 68. CU 62 also performs superscalar dependency checks. Bus interface unit (Blu) 70 interfaces IU 42 and DU 68 to a system bus (not shown).

SLOT0 and SLOT1 pipelines are in DU 68, SLOT2 is in MU 66, and SLOT3 is in SU 64. CU 62 provides source operands and control buses to pipelines SLOT0:SLOT3 and handles GRF 52 and CRF 54 file updates. CU 62 accepts external inputs such as interrupts and reset, and supports emulation unit (EU) 72. CU 62 also handles exceptions due to protection violations occurring during address translations. Mixed 16- and 32-bit instructions can be issued in parallel, up to four at a time, in one embodiment of micro-architecture 60. However, many different variations of 16-bit, 32-bit, and other length instructions may be implemented in other embodiment, all within the scope of the disclosed subject matter. Micro-architecture 60, furthermore, may also support moving two 64-bit double words from CU 62 for each cycle.

GRF 52 holds thirty-two 32-bit registers which can be accessed as single registers, or as aligned 64-bit pairs. GRF 52 also holds all pointer, scalar, vector, and accumulator data and provides flexibility for service as a compiler target. CRF 54 holds special-purpose registers such as program counter, status register.

Micro-architecture 60 features a hybrid execution model that mixes the advantages of superscalar and VLIW execution. Superscalar issue has the advantage that no software information is needed to find independent instructions. There is no added code size or encoding inefficiencies to provide multi-issue execution. Additionally, superscalar issue can find parallel instructions over branch boundaries which can be difficult for a compiler.

The advantage of VLIW execution is that the software may identify many more than two instructions for parallel execution, especially in software pipelined loops which are typical of DSP code. Micro-architecture 60, therefore, combines the strengths of both execution models by creating a hybrid model. The execution model of micro-architecture 60 communicates VLIW packet information for packets of three or more instructions. For parallelism of one and two instructions, micro-architecture 60 is responsible for multi-instruction execution via dual superscalar issue. In this way, micro-architecture 60 can deliver wide issue parallelism with a minimal code size penalty. Parallelism over branch boundaries in control code may also be exploited.

As described in further detail below, instructions are encoded using either 16-bit instructions or 32-bit instructions. The two instruction sizes can be freely mixed in a program. These mixed size instructions can be packetized in groups for parallel execution. The packets may be of variable size. The 16-bit instruction set is chosen to carefully match the needs of a compiler generating dense control code. For a more complete understanding of the approach that one embodiment of the disclosed subject matter may employ for distinguishing instruction sizes and packets of mixed size instructions refer to commonly-assigned U.S. patent Publication No. 20060218379 entitled "Method and System for Encoding Variable Length Packets with Variable Instruction Sizes."

DSP 40, using micro-architecture 60, specifically supports the following classes of applications: (1) communications signal-processing (e.g., modems); (2) video processing (e.g., H.264 format); (3) image processing; (4) audio processing; (5) 3-D graphics front-end software; and (6) supporting control code, protocol stacks, RTOS, etc. As such, DSP 40 issues both VLIW instruction packets, as well as and individual superscalar issue instructions. Issue width for individual instructions can range from one instruction per issue slot to maximum VLIW packet plus one. As an example, DSP 40 may issue as many as four instructions in a VLIW packet per issue slot. Also, DSP 40 may issue one or two instructions using superscalar issue.

In operation, DSP 40 constantly looks at the instruction stream to find a VLIW instruction packet that may be inserted into IQ 44. If such an instruction packet exists, then IU 42 inserts the VLIW instruction packet into IQ 44. Similarly, DSP 40 looks for an individual instruction in the instruction stream and loads the instruction into IQ 44. These instructions are issued in superscalar mode provided that the two such instructions do not possess registry dependencies and no hardware hazard exists (described in more detail below).

CU 62, therefore, operates at the center of the DSP 40 core, in terms of both connectivity and physical placement to support interleaved multi-threading (IMT). IMT allows for high throughput without complex out of order execution logic. In IMT, the DSP 40 switches to a different thread after each instruction fetch. Since IMT eliminates control and data dependencies between instructions in the pipeline, pipeline hazards cannot arise and the processor pipeline can be easily build without the necessity of complex forwarding paths. This leads to processor pipeline 46 demonstrating no hardware interlocking. Moreover, the context-switching overhead is zero cycles. IMT requires at least as many threads as pipeline stages in the processor.

In each of pipelines slots, SLOT0:SLOT3, six pipeline stages occur, beginning with a decode stage and ending with a write back stage for register update. After the decode stage decodes an instruction and initiates a register file read, a register file stage performs a register file read and launches the data to execution units. Register file read is possible in both decode and register file stages, because of DSP 40's IMT micro-architecture, which provides a dedicated GRF 52 and CRF 54 file for each thread. The staggered access of register files in the decode and register file read stages reduces the number of read ports required for the register file. Data from the GRF 52 or from the instructions is provided to the four execution slots with the opcode during the register file stage. Branch instructions are resolved during the register file stage and IR 42 is directed to get the next sequential or the target address of the branch.

Two execution stages support instruction execution, while a third execution stage provides both instruction execution and register file update. Moreover, a fourth stage provides for registry file updating. During the execution and write back stages IU 42 builds the next IQ 44 entry to be executed. Finally, a write back stage performs register update. The staggered write to register file operation is possible due to IMT micro-architecture and saves the number of write ports per thread. Because the pipelines have six stages, CU 52 may issue up to six different threads.

The following discussion describes the operation of one embodiment of decode and issue circuitry 48. Decode and issue circuitry 48 decodes the instructions provided by IU 42 and issues the opcode and immediate operands to the execution units, SU 64, MU 66, and DU 68. If decode and issue circuitry 48 receives a VLIW packet, the instructions align with the slots and no steering is required. Because VLIW instructions within the packet do not have any register dependencies, no dependency check occurs. IQ 44 may provide up to four superscalar instructions to decode and issue circuitry 48 at a time. And, DSP 40 can issue maximum of two instructions if there are no resource collisions or register dependencies.

In case of superscalar instructions, slot allocation and dependency check for the two instructions is necessary. Decode and issue circuitry 48 performs slot allocation for assigning an instruction to a slot. At such slot the instruction may be executed. Decode and issue circuitry 48 also performs registry dependency checking to ensure that younger instruction (I1) does not use results generated by older instructions (I0). If the dependency checks pass, I0:I1 are issued. In the case of a dependency between I0 and I1, only I0 is issued.

Decode requirements of superscalar instructions and VLIW packets are slightly different. Not much decoding is required for VLIW packet. This is because with VLIW instructions the compiler assures that that there are no register dependencies within the packet. Similarly, VLIW packets require no instruction steering or execution slot allocation, because the compiler also aligns instructions with the execution slots. The only decode performed with VLIW instructions is for detecting whether the instructions have certain Rs or Rt fields (described below) and whether operand sizes are 32 bits or 64 bits. DSP 40 uses this information to turn on the enables for GRF 52 for 32- or 64-bit reads, so as to reduce energy consumption.

In contrast, for superscalar instruction issue, slot assignments according registry dependences and hardware hazards must occur. In addressing superscalar instructions decode functions, recall that DSP 40 may issue a maximum of two superscalar instructions in a cycle. A main reason that DSP 40 becomes a single issue machine is that slot/resource collision and register dependencies arise between the two instructions. Moreover, superscalar instruction issue requires instruction steering as I0 can be steered to any of the four slots SLOT1:SLOT3 according to the instruction class. Slot collision detection and register dependency check may occur in the decode stage.

One embodiment of the disclosed subject matter includes a slot collision avoidance algorithm to resolve a slot collision or resource hazard between I0 and I1. When such occurs, I1, the younger instruction, is not issued in the decode stage. Instead, I1 is issued once the I0 instruction is committed. The optimal slot allocation solution for I0 and I1 includes I0 slot allocation being dependent on I1 slot allocation and vice-versa. FIG. 4, therefore, shows one embodiment of table 82 for depicting the result of slot allocation algorithm for instructions I0 and I1.

In FIG. 4, each entry indicates the slot allocated to I0 and slot allocated to I1. The term, NG(no-go), indicates that I1, (the older) instruction, will not be issued. Those cells with the "X" indicate that such a situation cannot happen. As an example, 1/0 indicates I0 is allocated to SLOT1 and I1 is allocated to SLOT0. Similarly, 0/NG indicates I0 is allocated to slot 0 and I1 is not issued. The cells with horizontal hash shading indicate cases where I1 slot allocation depends on I0. Similarly, cell with vertical shading marks indicate cases where I0 slot allocation depends on I1.

In certain situations, DSP 40 operates as a single issue superscalar machine due to structural hazards. These hazards occur when both I0 and I1 are ST ICLASS, S ICLASS, M ICLASS. Register dependency can make DSP 40 a single issue machine. There are the following types of dependencies between the older and younger instruction. These include a write after write hazard (WAW), wherein two instructions are writing to the same target. A read after write (RAW) hazard occurs when a younger instruction is reading the target of the older instruction. However, if the older and younger instructions issue together, the read receives the old data. In the present embodiment, a WAW hazard is not common. Accordingly, one embodiment of DSP 40 does not detect this type of register hazard. So, the older and younger instructions are issued even if they have a WAW hazard. Then, the younger instruction may be discarded in the decode stage. The RAW hazard is detected in the decode stage and, in this case, the younger instruction is not even issued. It will be issued in the future thread cycle.

FIG. 5 conceptually relates certain aspects of read after write hazard processing for one embodiment of the disclosed subject matter. Specifically, in FIG. 5 the RAW hazard detection process 90 includes detecting collisions between younger instruction 92 and older instruction 94. Comparisons 96 occur between younger instruction 92 operands Rt 98, Rs 100 and Rx 102 and older instruction 94 operands Rx 104 and Rd/Rx 106. Detection of the RAW hazard, therefore, uses six comparators 96 per thread to detect RAW hazard. If there is RAW hazard, then older instruction 94 is issued by itself and the younger instruction is not issued in the present cycle.

FIG. 6 provides a steering logic diagram 110 for an illustration of the disclosed subject matter. During the decode stage 112 of DSP 40, pipeline instructions I0:I3 are steered to the execution slots SLOT0:SLOT3 and decode-based GRF 52 read access begins. Enables and register indices for the four read ports to be read in the register file stage 114 are also generated in decode stage 112. Data required by the slots for execution, such as opcode, immediate values, predicate registers and control registers are sent to the corresponding execution slots in at the beginning of register file stage 114. GRF 52 provides the data for the reads started in decode stage 112 during the middle of the register file stage 114. For the read accesses started in register file stage 114, GRF 52 provides data in the first execution stage 116. Dependency checks and slot allocation for superscalar instructions are also done during decode stage 112.

VLIW packet instructions are aligned to their corresponding slots and do not require steering. In decode stage 112 instruction steering, DSP 40 can issue two superscalar instructions in one cycle and they could go to any of the four execution slots SLOT0:SLOT3 if no resource collision occurs.

FIG. 7 shows dataflow diagram 120 of a superscalar issue algorithm for performing slot allocation (SA) and dependency checks (Dep) in either the decode stage. So, with reference to FIG. 7, at node 122, a new IQ 44 entry occurs and I0:I1 may occur. In this process, a number of different paths are possible. For example, path 124 shows I0 being committed and I1 being not valid. Such a case may occur when I0 entry has only one valid instruction. Alternatively, path 126 shows I0 being replayed. Since I0 is the older instruction, no forward progress will occur upon replaying I0. In path 128, I0 and I1 are committed and process flow goes to node 130. Alternatively, from node 122, I1 may collide with I0 and I0 be committed via path 132 to node 134.

At node 130, slot allocation, dependency checks, and issue for I2 and I3 may occur. Path 136 depicts I2 being replayed to node 130. Path shows I2 being committed and I3 not being valid for flow back to node 122. Alternatively, in path 140 I3 collides with I2, and I2 is committed to move to node 142.

At node 134, slot allocation, dependency checking, and issue of I1 and I2 occurs. From node 134, I1 may be replayed along path 144 back to node 134. Or, along path 146, I1 may be committed and I2 is not valid, causing flow to return to node 122. Alternatively, if I2 collides with I1, and I1 is committed, then flow goes along path 148 to node 130.

At node 142, I3 issue occurs. From node 142, I3 replay may occur along path 150 back to node 142. From node 142, along path 152 I3 is committed, and process flow returns to node 122.

Now, no dependency checking or slot allocation is required for VLIW packet operations, since the instructions are parallel. In case of superscalar issue, however, slot allocation and RAW register, and predicate dependency check are required. For I0 and I1, dependency checks and slot allocation occurs during the decode stage.

FIG. 8 portrays write after write (WAW) hazard process 160 for the GRF 52 of the illustrated embodiment. WAW hazard detection process 160 uses comparisons 162 to compare, for example, operands Rx 164 and Rd/Rx 116 of younger instruction 168 with operands Rx 170 and Rd/Rx 172, for example, of older, instruction 174.

DSP 40 always tries to issue two instructions per cycle to maximize performance. As a result of the DSP 40 circuitry, the micro-architecture 60 and the various slot allocation, dependency checking, and instruction issue steps and processes described above, the present embodiment provides an efficient process for the mixed issuing and processing of superscalar and VLIW instructions. The helps to establish a robust digital signal processing environment for wireless handset operations.

In summary, therefore, the disclosed subject matter provides a method and a system for issuing and executing mixed architecture instructions in a multiple-issue digital signal processor receives in a mixed instruction listing a plurality of digital signal processor instructions. The plurality of digital signal processor instructions includes a plurality of parallel executable instructions (e.g., VLIW instructions or instruction packets) mixed among a plurality of series executable instructions (e.g., superscalar instructions). The series executable instructions are associated by various instruction dependencies. The method and system further identify in the mixed instruction listing the plurality of parallel executable instructions. Once identified, the parallel executable instructions are first executed in parallel irrespective of any such instruction's relative order in the mixed instruction listing. Then, the series executable instructions are executed serially according to said various instruction dependencies.

The approach of the disclosed subject matter may be used in operating systems for combining the advantages of both VLIW and superscalar instruction processing. In an operating system, VLIW instruction issuance may occur frequently. This is because operating system instructions are frequently of the form requiring (1) the checking of a certain condition, and (2) executing a responsive instruction. This creates minimal dependencies and allows for the rapid identification and issuance of VLIW instructions.

The processing features and functions described herein can be implemented in various manners. For example, not only may DSP 40 perform the above-described operations, but also the present embodiments may be implemented in an application specific integrated circuit (ASIC), a microcontroller, a microprocessor, or other electronic circuits designed to perform the functions described herein. The foregoing description of the preferred embodiments, therefore, is provided to enable any person skilled in the art to make or use the claimed subject matter. Various modifications to these embodiments will be readily apparent to those skilled in the art, and the generic principles defined herein may be applied to other embodiments without the use of the innovative faculty. Thus, the claimed subject matter is not intended to be limited to the embodiments shown herein but is to be accorded the widest scope consistent with the principles and novel features disclosed herein.

What is claimed is:

1. A method for issuing and executing mixed architecture instructions at a multiple-issue digital signal processor, the method comprising:

receiving a mixed instruction listing including a plurality of digital signal processor instructions, said plurality of digital signal processor instructions comprising a plurality of parallel executable instructions mixed among a plurality of series executable instructions, said plurality of parallel executable instructions comprising a very long instruction word (VLIW) packet that includes VLIW instructions, said plurality of series executable instructions associated by various instruction dependencies;

identifying in said mixed instruction listing said plurality of parallel executable instructions;

executing in parallel said plurality of parallel executable instructions irrespective of the relative order of said parallel executable instructions in said mixed instruction listing; and executing serially said plurality of series executable instructions according to said various instruction dependencies after executing in parallel said plurality of parallel executable instructions.

2. The method of claim 1, further comprising the step of executing superscalar instructions as said plurality of series executable instructions.

3. The method of claim 1, further comprising the step of executing said plurality of parallel executable instructions independent of performing a slot collision avoidance process on said plurality of digital signal processor instructions.

4. The method of claim 1, further comprising the step of detecting a read after write hazard among said plurality of series executable instructions.

5. The method of claim 1, further comprising the step of detecting a write after read hazard among said plurality of series executable instructions.

6. The method of claim 1, wherein said step of executing said plurality of parallel executable instructions further comprises the step of executing up to four parallel VLIW instructions in a single issue slot.

7. The method of claim 1, wherein said step of executing said plurality of parallel executable instructions further comprises the step of executing the VLIW packet, the VLIW packet comprising up to four VLIW instructions and one header instruction in a single issue slot.

8. The method of claim 1, wherein said step of executing said plurality of series executable instructions further comprises the step of executing up to five series executable instructions in a single issue slot.

9. An integrated circuit forming a portion of a digital signal processor for encoding and processing instructions of mixed lengths, the integrated circuit comprising:
 an instruction unit operable to receive a mixed instruction listing including a plurality of digital signal processor instructions, said plurality of digital signal processor instructions comprising a plurality of parallel executable instructions including at least one very long instruction word (VLIW) packet having a packet header and at least one VLIW instruction mixed among a plurality of series executable instructions, said plurality of series executable instructions associated by various instruction dependencies;
 a decode circuit operable to identify in said mixed instruction listing said plurality of parallel executable instructions;
 a control circuit operable to execute in parallel said plurality of parallel executable instructions irrespective of the relative order of said plurality of parallel executable instructions in said mixed instruction listing and operable to execute serially said plurality of series executable instructions according to said various instruction dependencies after executing in parallel said plurality of parallel executable instructions.

10. The integrated circuit of claim 9, wherein said control circuit further comprises circuitry for executing the at least one VLIW instruction.

11. The integrated circuit of claim 9, wherein said control circuit further comprises circuitry for executing said plurality of parallel executable instructions independent of performing a slot collision avoidance process on said plurality of digital signal processor instructions.

12. The integrated circuit of claim 9, further comprising decoding and issue circuitry for detecting a read after write hazard among said plurality of series executable instructions.

13. The integrated circuit of claim 9, further comprising decoding and issue circuitry for detecting a write after read hazard among said plurality of series executable instructions.

14. The integrated circuit of claim 9, wherein said control circuit further comprises circuitry for executing up to four parallel VLIW instructions in a single issue slot.

15. The integrated circuit of claim 9, wherein said control circuit further comprises circuitry for executing the VLIW packet in a single issue slot, the VLIW packet comprising four VLIW instructions.

16. The integrated circuit of claim 9, wherein said control circuit further comprises circuitry for executing up to five series executable instructions in a single issue slot.

17. A digital signal processor for encoding and processing instructions of mixed lengths, the digital signal processor comprising:
 means for receiving in a mixed instruction listing including a plurality of digital signal processor instructions, said plurality of digital signal processor instructions comprising a plurality of parallel executable instructions including at least one very long instruction word (VLIW) instruction packet mixed among a plurality of series executable instructions, the at least one VLIW instruction packet including multiple instructions determined by a compiler to be executable in parallel, said plurality of series executable instructions associated by various instruction dependencies;
 means for identifying in said mixed instruction listing said plurality of parallel executable instructions;
 means for executing in parallel said plurality of parallel executable instructions irrespective of the relative order of said plurality of parallel executable instructions in said mixed instruction listing; and
 means for executing serially said plurality of series executable instructions according to said various instruction dependencies after executing in parallel said plurality of parallel executable instructions.

18. The digital signal processor of claim 17, wherein said executing means further comprises means for executing the at least one VLIW instruction packet.

19. The digital signal processor of claim 17, wherein said executing means further comprises means for executing superscalar instructions as said series executable instructions.

20. The digital signal processor of claim 17, wherein said executing means further comprises means for executing said plurality of parallel executable instructions independent of performing a slot collision avoidance process on said plurality of digital signal processor instructions.

21. The digital signal processor of claim 17, further comprising means for detecting at least one of a read after write hazard and a write after read hazard among said plurality of series executable instructions.

22. The digital signal processor of claim 17, wherein said executing means further comprises means for executing up to four parallel VLIW instructions in a single issue slot.

23. The digital signal processor of claim 17, wherein the VLIW packet includes up to four VLIW instructions and one header instruction.

24. A computer readable medium having computer readable instructions executable by a digital signal processor for encoding and processing instructions of mixed lengths, the computer readable instructions comprising instructions executable by the digital signal processor to:
 receive a mixed instruction listing including a plurality of digital signal processor instructions, said plurality of digital signal processor instructions comprising a plurality of parallel executable instructions including at least one packetized very long instruction word (VLIW) instruction mixed among a plurality of series executable instructions, said plurality of series executable instructions associated by various instruction dependencies;
 identify in said mixed instruction listing said plurality of parallel executable instructions;

execute in parallel said plurality of parallel executable instructions irrespective of the relative order of said plurality of parallel executable instructions in said mixed instruction listing; and execute serially said plurality of series executable instructions according to said various instruction dependencies after executing in parallel said plurality of parallel executable instructions.

25. The computer readable medium of claim 24, further comprising computer readable instructions executable by the digital signal processor to execute the at least one packetized VLIW instruction.

* * * * *